2,912,415
CARBON DISULFIDE ACTIVATION IN PYRROLIDONE POLYMERIZATION

William B. Black and Howard G. Clark, Decatur, Ala., assignors to The Chemstrand Corporation, Decatur, Ala., a corporation of Delaware No Drawing. Application April 16, 1958
Serial No. 728,760

17 Claims. (Cl. 260—78)

This invention relates to a new process for polymerizing pyrrolidone. More particularly, the invention is concerned with a new polymerization procedure for the manufacture of pyrrolidone polymers wherein there are employed new catalyst-activator systems.

Pyrrolidone is normally polymerized in the presence of a polymerization catalyst, such as the alkali metals and various organic metallic compounds, as well as sodium amide, calcium oxides and hydroxides, etc. It has been found that the activity of said catalysts during the polymerization reaction can be enhanced by the addition thereto of various compounds which are classed as catalyst or polymerization activators. For example, among the compounds heretofore proposed as catalyst or polymerization activators there may be named the acyl compounds, such as acetyl pyrrolidone, acetyl morpholone, and the like; lactones, such as gamma-butyrolactone, and the like; alkyl esters of mono- and dicarboxylic acids, such as ethyl acetate, ethyl oxalate, and the like; and the esters of polyhydric alcohols, such as ethylene glycol diacetate, etc. However, the presently known catalyst-activator systems for the polymerization of pyrrolidone leave much to be desired.

Many of the compounds heretofore proposed as catalyst or polymerization activators for pyrrolidone polymerization are difficult to handle, which obviously makes them undesirable from a commercial standpoint. Further, many of the prior art compounds proposed as activators tend to oxidize the polymers as they are formed resulting in undesirable changes in color and in detrimental changes in physical properties of the polymers, such as reduced solubility. In addition, many of said compounds introduce end groups into the polymer chain which deleteriously effect the solubility of the polymer and decrease the dye receptivity of the polymer. Accordingly, there has been a need in the art for a catalyst-activator system which overcomes the above disadvantages and which is easily and readily adaptable to a commercial operation.

Accordingly, it is a principal object of the present invention to provide new catalyst-activator systems for the polymerization of pyrrolidone. It is another object of the invention to provide new catalyst-activator systems for the polymerization of pyrrolidone which result in the formation of polymers having desirable and improved physical properties, such as good solubility, excellent color and high molecular weight. It is a further object of the invention to provide a new process for preparing pyrrolidone polymers. Other objects and advantages of the invention will be apparent from reading the description thereof hereinafter.

In general, the objects of the present invention are accomplished by employing carbon disulfide as a catalyst or polymerization activator when polymerizing monomeric pyrrolidone under polymerizing conditions using a polymerization catalyst therefor.

In the practice of the instant invention the carbon disulfide activator may be utilized with any of the known catalysts usually employed in the polymerization of monomeric pyrrolidone. The molar ratio of catalyst to monomeric pyrrolidone in the reaction mixture may be varied from 1:5 to 1:280. The molar ratio of activator to catalyst may be varied from 1:1.1 to 1:200. That is to say, one mole of activator may be reacted with from 1.1 to 200 moles of catalyst but there should always be a slight excess of catalyst present. Then again, when the mole percent of catalyst in the reaction mixture is increased above one, then there must be a corresponding increase in monomer concentration, since there must be at least 5 moles of monomer present for each mole of catalyst. For example, when employing 200 moles of catalyst and one mole of activator, there must be at least 1000 moles of monomer present in the reaction mixture.

Among the catalysts which may be employed in the practice of the present invention are the alkali metals, namely, sodium, potassium and lithium, the hydrides, hydroxides, oxides and salts of the alkali metals, that is, such salts as sodium, potassium and lithium pyrrolidone. Organic metallic compounds, preferably those which are strongly basic, may also be utilized as catalysts in the invention. Examples of such compounds are the lithium, potassium and sodium alkyls and the aryls of the alkali metals, such as sodium phenyl and the like. Another suitable catalyst is sodium amide.

The polymerization reaction of this invention is carried out at temperatures within a range of −70° C. to 100° C. In the preferred practice of the invention the polymerization reaction is carried out at a temperature in the range of 20° C. to 70° C. The reaction time varies with the temperature and the amount of monomer employed. Where higher temperatures are used in the polymerization reaction, the total time required to complete polymerization is shorter. The polymerization period is also greatly effected by the catalyst-activator systems.

While it is not positively known exactly what takes place when pyrrolidone is polymerized in accordance with the present invention, it is believed that the polymerization is carried out by the formation of ionic pyrrolidone salts. For example, when one employs sodium hydroxide as a catalyst, a reversible reaction takes place between the monomeric pyrrolidone molecules and the hydroxide ion with the subsequent formation of water. Since this reaction is reversible, it is necessary that the water be removed in order to carry out polymerization. Formation of the pyrrolidone anion results in an electron distribution which is nucleophilic. In order for chain propagation to take place, the nucleophilic ion attaches to a pyrrolidone ring which has been activated by an activator molecule thereby causing a weak bond in the ring between the nitrogen and carbonyl group and causing the ring to open, forming a newly activated position and an anion on the polymer chain. A proton (hydrogen ion) from a monomeric pyrrolidone transfers to the chain anion resulting in an amide linkage and the regeneration of a nucleophilic pyrrolidone anion to further catalyze the reaction. The catalyst is continuously consumed and regenerated throughout the entire reaction by the transfer of a proton (hydrogen ion) giving rise to the formation of the pyrrolidone anion. It is believed that an activator initiates polymerization by displacing the hydrogen on the nitrogen atom of the pyrrolidone ring, thereby causing an electrophilic state within the monomeric pyrrolidone molecule such that the bond between the nitrogen atom and the carbonyl group of the molecule is broken when such molecule is attacked by a pyrrolidone anion, thereby forming a straight chain. Such chain is then attached to a pyrrolidone ring by bonding to the nitrogen atom therein and the ring structure is in turn opened by the attack of nucleophilic pyrrolidone ion formed by the transfer of a proton from a monomeric pyrrolidone molecule to a chain nitrogen. Irrespective of whether or not the above theory is correct, the use of carbon disulfide in the polymerization of pyrrolidone, in accordance with the present invention, has produced unexpectedly good results, as herein pointed out.

Generally, in carrying out a polymerization reaction according to the present invention, the monomer, catalyst and activator are placed in a polymerization vessel and subjected to polymerization temperatures, as hereinabove defined. However, the steps necessary to obtain complete polymerization will vary, depending upon the type of catalyst which is employed. For example, many of the catalysts, such as sodium hydroxide, cause the formation of water during the polymerization reaction. The presence of such water has a deleterious effect upon the polymerization reaction, namely, it hinders further polymerization and even brings the same to a halt in many instances. Accordingly, in order to achieve the desired results, it is necessary to remove such water of reaction from the reaction medium. This can easily be accomplished by a simple vacuum distillation. Therefore, when employing a catalyst, such as sodium hydroxide, the monomeric pyrrolidone is placed in the polymerization vessel and the catalyst added thereto. The reactants are then subjected to vacuum distillation and mechanical stirring in order to remove the water formed. When all of the water in the reaction vessel has been completely removed, the activator is then added to the reaction mixture and the reaction is continued. Where a catalyst-activator system containing an alkali hydride as catalyst is employed, all of the reactants may be added to the polymerization vessel simultaneously and thereafter the reaction is carried through to completion. An advantage in the use of sodium hydride is the step of removing water by distillation is eliminated, since a pyrrolidone salt and gaseous hydrogen are formed.

The method for preparing polypyrrolidone, as described and claimed in the instant invention, may be carried out by either solution, emulsion, suspension or bulk polymerization techniques. The solution and emulsion polymerizations may be either batch or continuous. When solution polymerization is employed, the monomeric pyrrolidone is dissolved in a solvent, such as 1,4-dioxane, the desired catalyst-activator is added to the solution and the polymerization carried out under the proper conditions. When emulsion or suspension polymerization is employed, the monomeric pyrrolidone containing a catalyst is dispersed in a non-solvent therefor, such as petroleum ether, containing an emulsifying agent. Subsequently, the desired activator is added to the dispersion and the reaction mixture is subjected to polymerization conditions. A suitable coagulant is then added to the polymerization mixture in order to precipitate the polymer. A suitable emulsifying agent which may be employed is sodium lauryl sulfate and a suitable coagulant is phosphoric acid.

The polypyrrolidone described or produced herein is particularly adapted for use in the manufacture of shaped articles such as filaments, fibers, films, and the like, as well as in the manufacture of molded articles. Lower molecular weight polypyrrolidone prepared in the same manner may be used in the preparation of coatings and lacquers. In preparing fibers from polypyrrolidone, various well-known methods may be employed, such as the melt-spinning, dry-spinning and wet-spinning methods. When using the wet-spinning method, the polypyrrolidone is dissolved in a suitable solvent and subsequently spun from the solution into a coagulating medium to form the fibers or filaments. Where the dry-spinning method is employed, the polypyrrolidone is dissolved in a suitable solvent and extruded into a heated atmosphere in order to remove the solvent from the polymer. In the melt-spinning method, the polymer is melted and spun into a heated atmosphere to precipitate the filaments.

Shaped articles which have a modified appearance or modified properties may be prepared from the polypyrrolidone by the use of various agents to accomplish the desired effect. Such agents include plasticizers, pigments, dyes, anti-static agents, fire-retarding agents and the like.

The following examples are given by way of illustration and not limitation. In the examples, all parts and percents are by weight unless otherwise indicated.

*Example I*

The following example is illustrative of a polymerization carried out in the absence of the carbon disulfide activator. To a 50 gram sample (0.589 mole) of monomeric pyrrolidone, there was added 0.5 gram (0.0208 mole) of sodium hydride while flushing the reaction vessel with dry nitrogen. The reaction mixture was allowed to stand at 25° C. There was no evidence of any polymer formation after 15 minutes and only a trace of polymer was noted after a half hour. After two hours the mixture was a thin mush. After an additional two hours the polymer formed was recovered by washing with water and filtering. After further washing with acetone, the polymer was air dried. There was a yield of 0.25 gram or 0.5 percent of polymer. The specific viscosity of a 0.5 percent solution of the polymer in 90 percent formic acid was 0.260.

*Example II*

To a 50 gram sample (0.589 mole) of monomeric pyrrolidone, there was added 0.5 gram (0.0208 mole) of sodium hydride and 0.448 gram (0.00589 mole) of carbon disulfide. The reaction mixture became semi-solid after several minutes. It was permitted to stand at 25° C. for four hours and became a hard cake. The cake was ground up to a moderately fine powder and washed with water. After further washing with acetone, the polymer was air dried. There was a yield of polymer of 24.9 grams or 49 percent in comparison with a 0.05 percent yield in Example I wherein no carbon disulfide was employed. The specific viscosity of a 0.5 percent solution of the polymer in 90 percent formic acid was 0.471 in comparison with a specific viscosity of 0.260 in Example I.

As may be seen from the above examples, the catalyst-activator system of the present invention will considerably speed up the polymerization reaction and result in greatly increased yields of polymer. Furthermore, the polypyrrolidone which results from a reaction mixture containing both a catalyst and activator has a much greater viscosity. When like samples of monomeric pyrrolidone were polymerized in the presence of carbon disulfide and the hydroxides, oxides and pyrrolidone salts of the alkali metals, like beneficial results were obtained.

The instant method of polymerizing pyrrolidone and the new catalyst-activator systems of this invention exhibit many advantages over the prior art. Carbon disulfide, for example, being easily converted to gaseous form at ordinary temperatures and pressures, can be added to the reaction mixture as a gas, thereby permitting excellent distribution of the activator throughout the monomer. Furthermore, the use of carbon disulfide decreases materially the amount of time needed to carry the reaction to completion and substantially increases the yield of polymer. The activator and catalysts employed in the instant invention are readily available and inexpensive. Numerous other advantages will be apparent to those skilled in the art.

As many apparently widely different embodiments of this invention may be made without departing from the spirit and scope thereof, it is to be understood that the same is not to be limited to the specific embodiments thereof except as defined in the appended claims.

We claim:
1. A process for polymerizing pyrrolidone which comprises forming a mixture containing monomeric pyrrolidone, carbon disulfide, and a catalyst selected from the group consisting of alkali metals, pyrrolidone salts, hydrides of alkali metals, alkyl and aryl salts of alkali metals, hydroxides and oxides of alkali metals, the molar ratio of carbon disulfide to catalyst being in the range of 1:1.1 to 1:200 and the molar ratio of catalyst to pyrrolidone being in the range of 1:5 to 1:280, and subjecting said mixture to a temperature in the range of —70° C. to 100° C. until polymerization is complete.
2. The process as defined in claim 1 wherein the polymerization catalyst is sodium hydride.
3. The process as defined in claim 1 wherein the polymerization catalyst is sodium phenyl.
4. The process as defined in claim 1 wherein the polymerization catalyst is sodium pyrrolidone.
5. The process as defined in claim 1 wherein the polymerization catalyst is potassium hydroxide.
6. The process as defined in claim 1 wherein the polymerization catalyst is lithium hydride.
7. The process as defined in claim 1 wherein any water which is formed during the reaction is completely removed by vacuum distillation before the addition of carbon disulfide.
8. A process for polymerizing pyrrolidone which comprises forming a mixture containing monomeric pyrrolidone, carbon disulfide, and a catalyst selected from the group consisting of alkali metals, pyrrolidone salts, hydrides of alkali metals, alkyl and aryl salts of alkali metals, hydroxides and oxides of alkali metals, the molar ratio of carbon disulfide to catalyst being in the range of 1:1.1 to 1:200 and the molar ratio of catalyst to pyrrolidone being in the range of 1:5 to 1:280, and subjecting the mixture to a temperature in the range of 20° C. to 70° C. until polymerization is complete.
9. The process as defined in claim 8 wherein any water which is formed during the reaction is completely removed by vacuum distillation before the addition of carbon disulfide.
10. The process as defined in claim 8 wherein the polymerization catalyst is lithium hydride.
11. The process as defined in claim 8 wherein the polymerization catalyst is potassium hydroxide.
12. The process as defined in claim 8 wherein the polymerization catalyst is sodium pyrrolidone.
13. The process as defined in claim 8 wherein the polymerization catalyst is sodium phenyl.
14. The process as defined in claim 8 wherein the polymerization catalyst is potassium hydride.
15. A process for polymerizing pyrrolidone which comprises forming a mixture containing monomeric pyrrolidone, carbon disulfide and sodium hydride, the molar ratio of carbon disulfide to sodium hydride being in the range of 1:1.1 to 1:200 and the molar ratio of sodium hydride to pyrrolidone being in the range of 1:5 to 1:280, and subjecting said mixture to a temperature in the range of 20° C. to 70° C. until polymerization is complete.
16. A process for polymerizing pyrrolidone which comprises forming a mixture containing monomeric pyrrolidone and sodium hydroxide, the molar ratio of sodium hydroxide to pyrrolidone being in the range of 1:5 to 1:280, reacting said mixture by subjecting the mixture to a temperature in the range of 20° C. to 70° C., removing the water which is formed during the reaction by vacuum distillation, adding carbon disulfide to the reaction mixture, the molar ratio of carbon disulfide to sodium hydroxide being in the ragne of 1:1.1 to 1:200, and thereafter maintaining the reaction mixture at a temperature in the range of 20° C. to 70° C. until polymerization is complete.
17. A process for polymerizing pyrrolidone comprising forming a mixture containing 0.00589 mole of carbon disulfide, 0.589 mole of monomeric pyrrolidone and 0.0208 mole of sodium hydride and subjecting the mixture to a temperature of 25° C. until polymerization is complete.

References Cited in the file of this patent
UNITED STATES PATENTS 2,809,958    Barnes et al. _____ Oct. 15, 1957